(No Model.)  A. H. FORBES.  2 Sheets—Sheet 2.

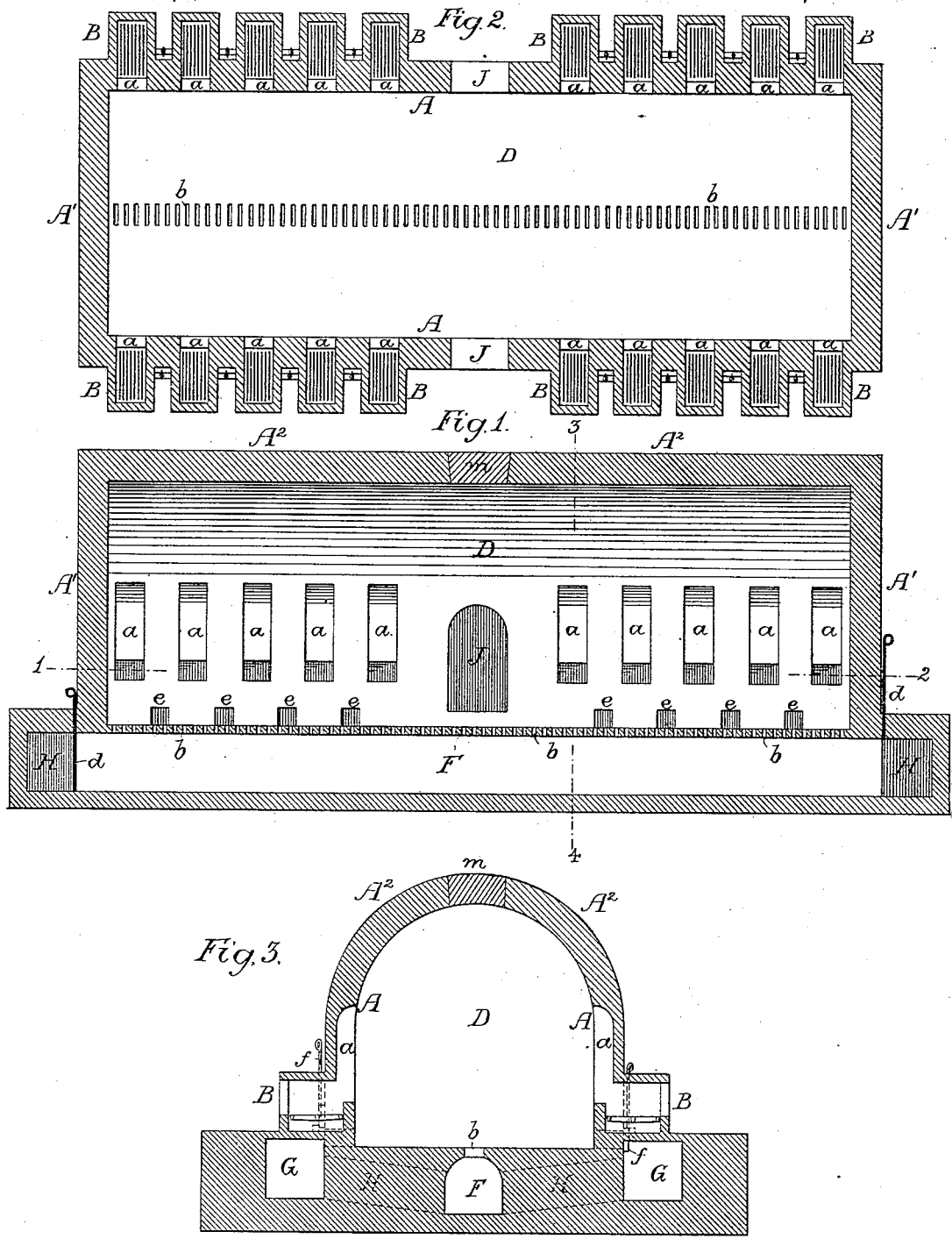

BRICK KILN.

No. 259,519.  Patented June 13, 1882.

Witnesses  
Hamilton Turner.  
James J. Tobin.

Inventor,  
Andrew H. Forbes  
by his Attorneys  
Howson and Sons

UNITED STATES PATENT OFFICE.

ANDREW H. FORBES, OF CAMDEN, NEW JERSEY, ASSIGNOR TO HUGH HATCH, OF STOCKTON TOWNSHIP, CAMDEN COUNTY, AND JOSEPH HATCH, OF CAMDEN, N. J.

BRICK-KILN.

SPECIFICATION forming part of Letters Patent No. 259,519, dated June 13, 1882.

Application filed January 3, 1882. (No model.)

*To all whom it may concern:*

Be it known that I, ANDREW H. FORBES, a citizen of the United States, and a resident of Camden, New Jersey, have invented an Improvement in Brick-Kilns, of which the following is a specification.

The object of my invention is to so construct a kiln for burning bricks that the draft in any part of the kiln can be readily regulated and the entire interior of the kiln rendered available for the piling of bricks.

Figure 4:
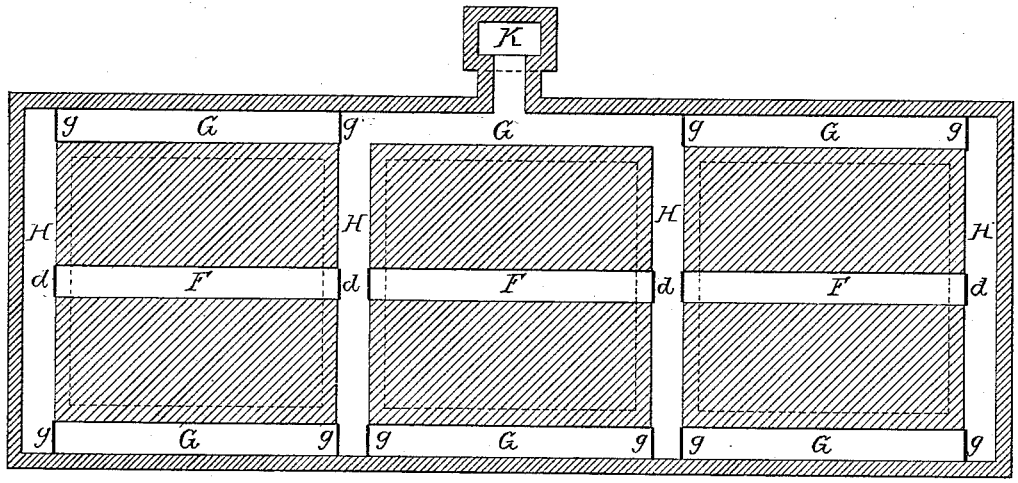

In the accompanying drawings, Figure 1 is a longitudinal section of a brick-kiln constructed in accordance with my invention; Fig. 2, a sectional plan of the same on the line 1 2; Fig. 3, a transverse section on the line 3 4; Fig. 4, Sheet 2, a diagram showing the arrangement of outlet-flues and dampers of a series of three kilns, and Fig. 5 a diagram illustrating another feature of the invention.

The kiln is of rectangular form, and has side walls, A, end walls, A', and arched top A².

B are the furnaces, which are arranged in rows along the outside of the walls A, and communicate with the chamber D of the kiln through flues $a$, each consisting of an internal recess or depression formed in said walls A.

Centrally in the floor E of the kiln is formed a row of openings, $b$, which communicate with a flue, F, beneath said floor, this flue communicating at each end with a transverse flue, H. Two dampers or valves, $d$, are used in connection with the flues F and H, one valve being arranged at each end of the flue F, as shown in the diagram, Fig. 4. On each side of the kiln is a sunken flue, G, which communicates with the chamber D of the kiln through openings $e$ at the base of the side walls, each of these openings being furnished with a valve, $f$, having a rod whereby it can be operated from the outside of the kiln. Each of the side flues, G, communicates with the end flues, H, a damper, $g$, being arranged at each end of each of the flues G. (See Fig. 4.) A chimney or stack, K, provides for the maintenance of draft through the flues F, G, and H, the dampers $d$ and $g$ providing for the general regulation of the draft—that is to say, permitting a direct or indirect flow of the products of combustion through any of the flues, or providing for the cutting off of the draft entirely from any of said flues; but in order to provide for a more accurate regulation of the draft than this affords I use the valves $f$, whereby the draft may be confined to any part of either of the flues G, and the products of combustion thus directed to any part of the kiln, as the proper burning of the contents of said kiln may demand, so that even burning is insured, and a product of uniform excellence obtained.

Access to the chamber D is obtained through doors J in the side walls, A, and the interior of the chamber D is entirely unobstructed by fire-place or flue casings, so that the piling of the bricks is not interfered with or the capacity of the kiln diminished. The rectangular shape of the kiln permits the piling of the bricks throughout the entire chamber D, there being no waste space as in a circular kiln.

Figure 5:
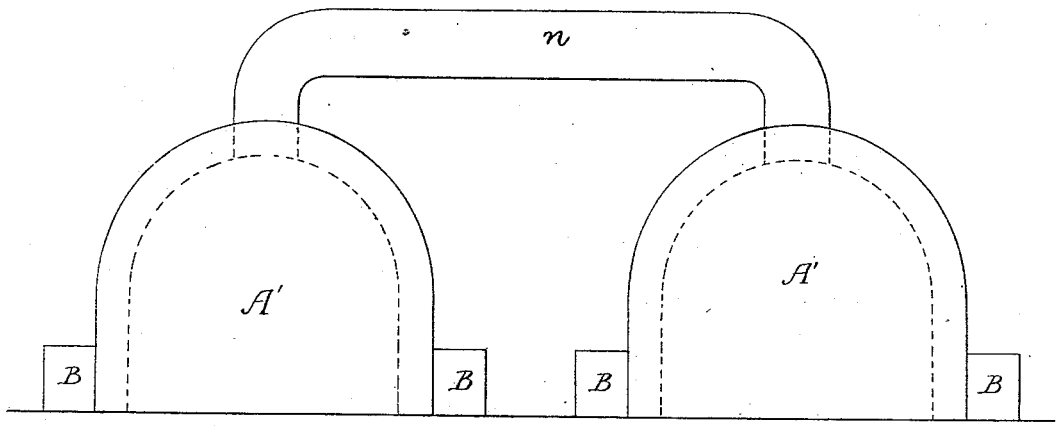

In the center of the arched roof A² of the kiln is an opening which, when the kiln is at work, is closed by a cover, $m$, but when the contents of the kiln have been properly burned the cover is removed and one end of a pipe, $n$, applied to the opening, the other end of the pipe communicating with the chamber D of another kiln, as shown in Fig. 5. The hot gases from the interior of the first kiln are thus directed to the second kiln and serve to dry or partially burn the contents of said second kiln.

I claim as my invention—

1. The combination of the kiln having the central chamber, D, with the external fire-places, B, communicating with said chamber D through flues $a$, each consisting of a simple recess or depression in the inside of the wall of the kiln, as set forth.

2. The combination of the kiln having the central chamber, D, fire-places communicating therewith, and exit-flues G G, located at the opposite sides of the kiln, and communicating with the chamber D near the bottom, through independently-valved openings $e$, as set forth.

3. The combination of the kiln having the chamber D, the fire-places B, the flues $a$, the central discharge-flue, F, with openings $b$, and the side exit-flues, G, with their independently-valved openings $e$, as set forth.

4. The combination of the kiln having fire-places B and chamber D, the central outlet-flue, F, side outlet-flues, G G, end connecting flues, H, and valves or dampers $d$ and $g$, as specified.

In testimony whereof I have signed my name to this specification in the presence of two subscribing witnesses.

ANDREW H. FORBES.

Witnesses:
  JAMES F. TOBIN,
  HARRY SMITH.